(12) United States Patent
Han et al.

(10) Patent No.: US 11,618,066 B2
(45) Date of Patent: Apr. 4, 2023

(54) HOT AND COLD COMPOSITE FORMED SQUARE AND RECTANGULAR STEEL TUBE WITH THICKENED CORNERS AND PRODUCTION METHOD

(71) Applicant: Sino Institute of Precise Tubes Industry (Guangzhou) Co., Ltd., Tangshan (CN)

(72) Inventors: Jingtao Han, Beijing (CN); Haifeng Xu, Beijing (CN); Yu Wang, Beijing (CN)

(73) Assignee: Sino Institute of Precise Tubes Industry (Guangzhou) Co., Ltd., Guangzhou (CN)

( * ) Notice: Subject to any disclaimer, the term of this patent is extended or adjusted under 35 U.S.C. 154(b) by 0 days.

(21) Appl. No.: 17/151,417

(22) Filed: Jan. 18, 2021

(65) Prior Publication Data

US 2021/0146414 A1 May 20, 2021

Related U.S. Application Data

(63) Continuation of application No. PCT/CN2019/095284, filed on Jul. 9, 2019.

(30) Foreign Application Priority Data

Jul. 17, 2018 (CN) .......................... 201810785443.4

(51) Int. Cl.
*F16L 9/02* (2006.01)
*B21B 37/24* (2006.01)
(Continued)

(52) U.S. Cl.
CPC .............. *B21B 37/24* (2013.01); *B21B 37/74* (2013.01); *B21B 45/0215* (2013.01);
(Continued)

(58) Field of Classification Search
CPC ... B21D 5/12; B21C 37/15; F16L 9/02; F16L 9/003
(Continued)

(56) References Cited

U.S. PATENT DOCUMENTS 3,266,051 A * 8/1966 Attwood .................. E04C 3/07
52/848
9,056,344 B2 6/2015 Muller et al.
(Continued)

FOREIGN PATENT DOCUMENTS

CN 102574191 A 7/2012
CN 103752644 A 4/2014
(Continued)

OTHER PUBLICATIONS

International Search Report issued in PCT/CN2019/095284 dated Sep. 5, 2019, (4p).

*Primary Examiner* — Patrick F Brinson
(74) *Attorney, Agent, or Firm* — Arch & Lake LLP

(57) ABSTRACT

A hot and cold composite formed square and rectangular steel tube and a production method for the same are provided. The radius of an outer corner of the square and rectangular steel tube meets the following conditions: when t is less than or equal to 6 mm, R is greater than 0 and less than 2.0 t; when t is greater than 6 mm and less than or equal to 10 mm, R is greater than 0 and less than 2.5 t; when t is greater than 10 mm, R is greater than 0 and less than 3.0 t, wherein t is the wall thickness of a straight tube part of the square and rectangular steel tube; R is the radius of each of the outer corners of the four corners of the square and rectangular steel tube; and the wall thickness of each corner of the square and rectangular steel tube is between 1.0 t and 1.8 t.

6 Claims, 3 Drawing Sheets

(51) Int. Cl.
  *B21B 37/74* (2006.01)
  *B21B 45/02* (2006.01)
  *F16L 9/00* (2006.01)

(52) U.S. Cl.
  CPC .................. *F16L 9/003* (2013.01); *F16L 9/02* (2013.01); *B21B 2045/0212* (2013.01); *B21B 2045/0227* (2013.01); *B21B 2261/20* (2013.01)

(58) Field of Classification Search
  USPC ........................................ 138/156, 171, 177
  See application file for complete search history.

(56) References Cited

U.S. PATENT DOCUMENTS

| | | | | |
|---|---|---|---|---|
| 2001/0013242 | A1* | 8/2001 | Kondou | B21C 37/104 |
| | | | | 72/379.2 |
| 2003/0164207 | A1* | 9/2003 | Kashiwazaki | C22C 21/06 |
| | | | | 148/440 |
| 2004/0035166 | A1* | 2/2004 | Maeda | B21D 5/015 |
| | | | | 72/48 |
| 2010/0193064 | A1* | 8/2010 | Takada | B21C 37/0815 |
| | | | | 72/368 |
| 2013/0020835 | A1* | 1/2013 | Szuba | B21C 37/0803 |
| | | | | 296/193.06 |

FOREIGN PATENT DOCUMENTS

| | | |
|---|---|---|
| CN | 104249090 A | 12/2014 |
| CN | 105107866 A | 12/2015 |
| CN | 208703542 U | 4/2019 |
| EP | 2392682 A1 | 12/2011 |
| JP | H01266913 A | 10/1989 |
| JP | H0523736 A | 2/1993 |
| JP | H0634810 U | 5/1994 |
| JP | H08117840 A | 5/1996 |
| JP | H09192732 A | 7/1997 |
| JP | 3625785 B2 | 3/2005 |
| JP | 2005112031 A | 4/2005 |
| KR | 20170074995 A | 6/2017 |

* cited by examiner

HOT AND COLD COMPOSITE FORMED SQUARE AND RECTANGULAR STEEL TUBE WITH THICKENED CORNERS AND PRODUCTION METHOD

CROSS-REFERENCE TO RELATED APPLICATIONS

This application is a continuation of PCT patent application No. PCT/CN2019/095284 filed on Jul. 9, 2019, which claims priority to a Chinese patent application No. 201810785443.4 filed on Jul. 17, 2018, the entire contents of both of which are hereby incorporated by reference for all purposes.

TECHNICAL FIELD

The disclosure relates to the technical field of metal material processing, in particular to a hot and cold composite formed square and rectangular steel tube with thickened corners and a production method.

BACKGROUND ART

Nowadays, people are increasingly pursuing weight reduction. The square and rectangular tube is a carrier for promoting the development of weight reduction. For example, the square and rectangular tube in the steel structure relies on its own structural characteristics, and the weight of the steel structure can be reduced by about 80% compared with an original brick-concrete structure. Meanwhile the yield strength of the square and rectangular tube is high, the modulus of the bending resistance section is large, the shear center and the centroid overlap, the torsional resistance is good, and the construction is fast; compared with other profile steel such as H-shaped steel and a circular tube, the square and rectangular tube has outstanding characteristics in comprehensive performance, and is known as the best steel structure column material.

However, the square and rectangular tube used at this stage is formed by a traditional cold-rolled forming process, therefore, the secondary work hardening effect will occur in the machining process, especially in the corners of the square and rectangular tube, the residual stress is very large, meanwhile the corner radius is very large, and the thickness is reduced. The use of the square and rectangular tube is greatly limited. In high-rise buildings, traditional cold-rolled square and rectangular tubes cannot be used as main materials, and meanwhile large round corners also weaken the welding performance of the square and rectangular tube.

SUMMARY

The present disclosure provides a hot and cold composite formed square and rectangular steel tube with thickened corners and a production method for the same.

In a first aspect of the present disclosure, a steel tube is provided, and the steel tube comprises: a square and rectangular steel tube with thickened corners formed by hot and cold composite, wherein the square and rectangular steel tube further comprises a straight tube and four corners, radius of an outer corner of the square and rectangular steel tube meets following conditions: when wall thickness of the straight tube of the square and rectangular steel tube (t) is less than or equal to 6 mm, radius of each of outer corners of the four corners of the square and rectangular steel tube (R) is greater than 0 and less than 2.0 t; when t is greater than 6 and less than or equal to 10 mm, R is greater than 0 and less than 2.5 t; and when t is greater than 10 mm, R is greater than 0 and less than 3.0 t; and wherein wall thickness of each corner of the square and rectangular steel tube is in a range of 1.0 t to 1.8 t.

In a second aspect of the present disclosure, a production method of a steel tube is provided. The production method of the steel tube comprises: leading a pre-finished square and rectangular steel tube into a subsequent production system after being rolled; heating four corners of the square and rectangular steel tube locally by an induction coil; leading the square and rectangular steel tube with the four corners heated into precision forming units in sequence, and performing rolling forming on the four corners of the square and rectangular steel tube in each forming unit, wherein at same time, the square and rectangular steel tube generates thermal tension between the two adjacent units by controlling differences between rotation speeds of rollers of every two adjacent units in rolling process, so that the redundant deformation in hot finishing process is eliminated; performing controlled cooling on the square and rectangular steel tube with a water-cooling system to ensure strength performance of the finished square and rectangular steel tube, and performing air-cooling on the square and rectangular steel tube; and cutting the finished square and rectangular steel tube.

DETAILED DESCRIPTION

Figure 1:
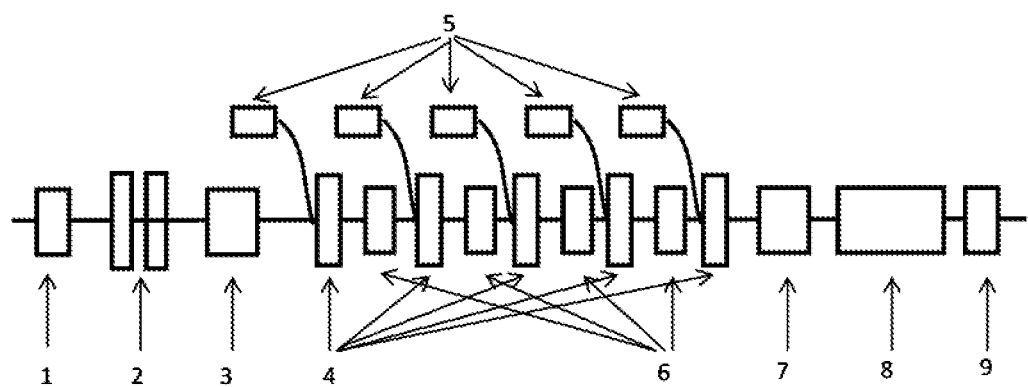
FIG. 1 is a schematic diagram of a system for forming a rectangular tube with thickened corners, provided by an example of the present disclosure.
Figure 2:
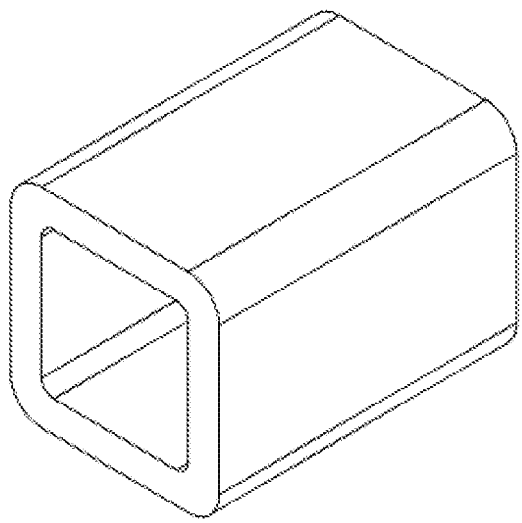
FIG. 2 is a diagram of a pre-forming tube of the present disclosure.
Figure 3:
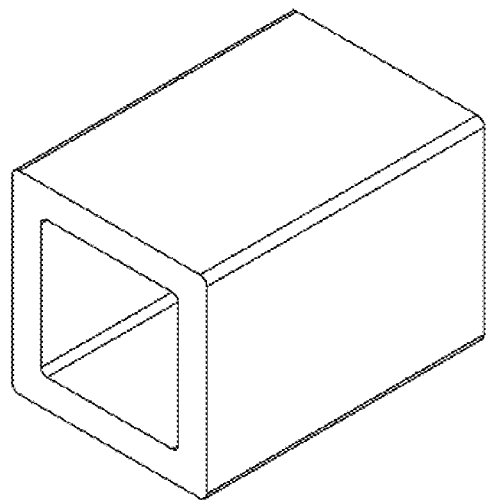
FIG. 3 is a diagram of a forming product of the present disclosure.
Figure 4:
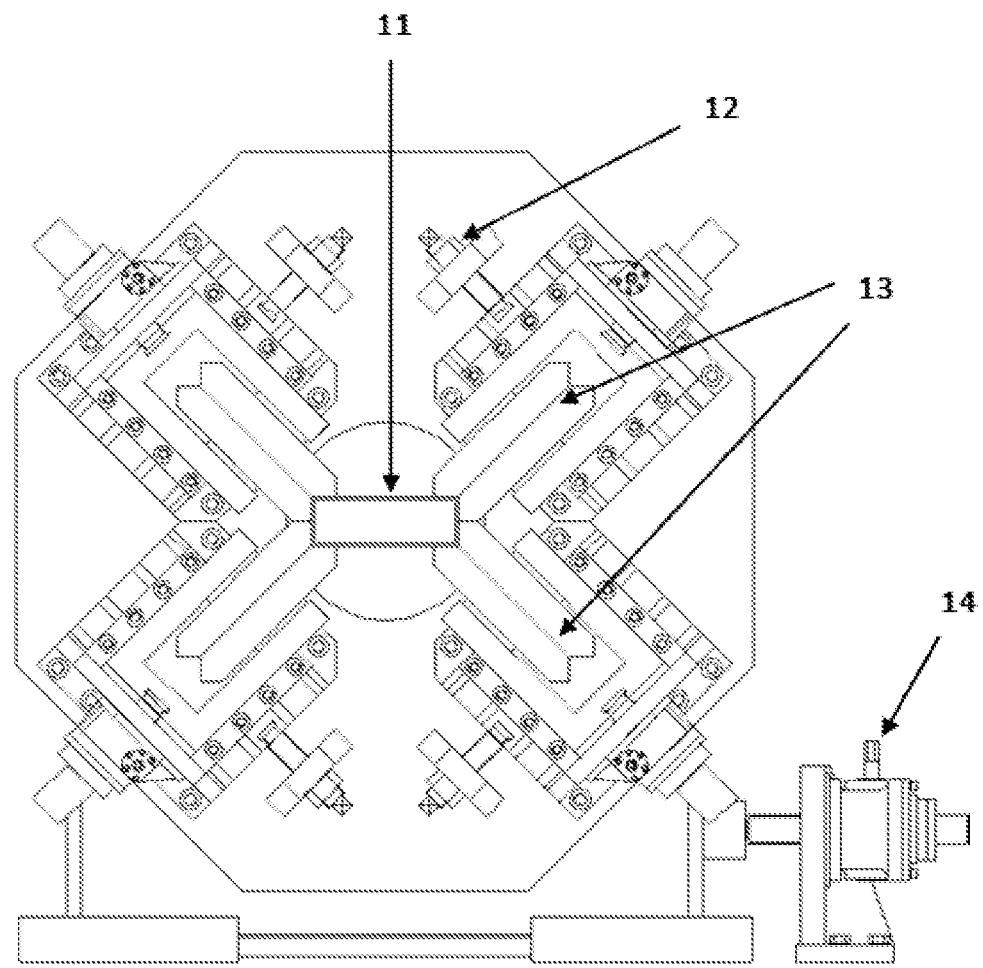
FIG. 4 is a schematic diagram of the structure of a precision forming unit of the present disclosure.
Figure 5:
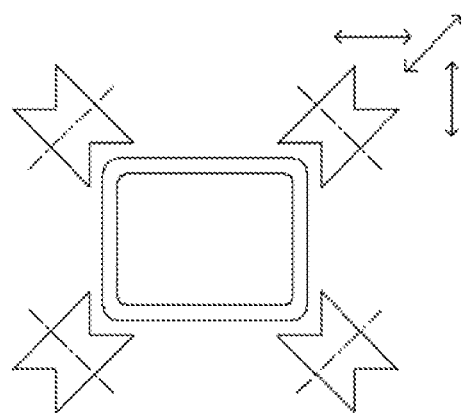
FIG. 5 is a schematic diagram of the rolling of the precision forming unit of the present disclosure.
Figure 6:
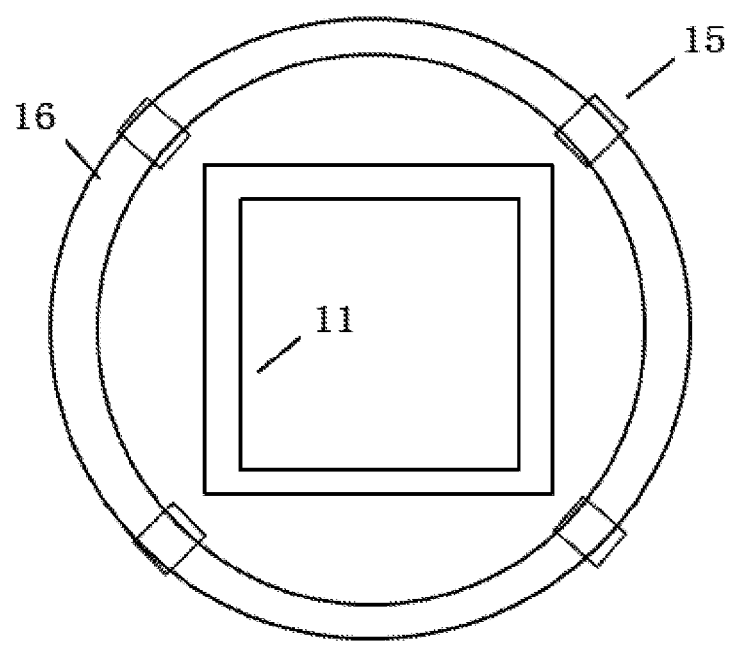
FIG. 6 is a schematic diagram of a local induction heating device of the present disclosure.

In order to make objectives, technical details of the examples of the present disclosure apparent, the technical solutions of the examples of the present disclosure will be described in a clearly and fully understandable way in connection with the specific examples and related drawings of the present disclosure. Apparently, the described examples are just part but not all of the examples of the present disclosure. Based on the described examples of the present disclosure herein, those skilled in the art can obtain other example(s), without any inventive work, which should be within the scope of the present disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if"

may be understood to mean "when" or "upon" or "in response to" depending on the context.

DESCRIPTION OF REFERENCE NUMERALS IN DRAWINGS

1. Feeding device; 2. Rolling and leading-in unit; 3. Local induction heating device; 4. Precision forming unit; 5. Thermodetector and automatic feedback system; 6. Flame spray gun heat preservation device; 7. Water-cooling device; 8. Air-cooling zone; 9. Cutting device; 11. Preformed square and rectangular tube; 12. Roller moving control knob; 13. Roller; 14. Rack rotating control knob; 15. Silicon steel sheet; 16. Induction heating coil.

The present disclosure is further illustrated in conjunction with the examples.

EXAMPLE I (1). A Q235 steel plate is subjected to pre-bending to form a preformed square and rectangular tube with the radius R of the outer round corner being equal to 20.0 mm and the size being 200*200 mm, wherein the wall thickness of a flat plate area is 8.0 mm, and the wall thickness of the corner is 7.8 mm.

(2). The preformed square and rectangular tube is fed into the local induction heating device through a guide roller; the heating temperature is 1050 DEG C; and the heating time is 15 seconds.

(3). Afterwards, the square and rectangular tube is formed by the five precision forming units; the temperature of the flame spray gun heat preservation system between every two forming units is 950 DEG C; the difference between the roller diameters of every two adjacent precision forming units is 3 mm; and the deformation degree of each precision forming unit is about 3%.

(4). after hot finishing, the rectangular tube with the size being 193*193 mm, the wall thickness of the flat plate area being 8 mm, the wall thickness of the corner being 8.8 mm, and the radius of the outer round corner being 2 mm is obtained; and the quality inspection shows that the residual stress and work hardening of the hot and cold composite formed square and rectangular tube are eliminated, and the plasticity is strengthened.

EXAMPLE II (1). The Q235 steel plate is subjected to pre-bending to form a preformed square and rectangular tube with the radius R of the outer round corner being equal to 36.0 mm and the size being 400*400 mm, wherein the wall thickness of the flat plate area is 20.0 mm, and the wall thickness of the corner is 19.6 mm.

(2). The preformed square and rectangular tube is fed into the local induction heating device through the guide roller; the heating temperature is 1000 DEG C; and the heating time is 15 seconds.

(3). Afterwards, the square and rectangular tube is formed by the five precision forming units; the temperature of the flame spray gun heat preservation system between every two forming units is 950 DEG C; the difference between the roller diameters of every two adjacent precision forming units is 3 mm; and the deformation degree of each precision forming unit is about 3%.

(4). after hot finishing, the rectangular tube with the size being 388*388 mm, the wall thickness of the flat plate area being 20.0 mm, the wall thickness of the corner being 22.1 mm, and the radius of the outer round corner being 5 mm is obtained; and the quality inspection shows that the residual stress and work hardening of the hot and cold composite formed square and rectangular tube are eliminated, and the plasticity is strengthened.

A hot forming technology, that is, a local induction heating technology, is introduced into a traditional roll forming process. High temperature can not only reduce the forming force of a material and improve the forming performance of the material, but also can eliminate the residual stress and possible cracking caused by work hardening. Meanwhile the hot and cold composite formed square and rectangular steel tube has a compact corner profile and very small radii of inner corners and outer corners; and the angle of the corner is close to 90 degrees, accompanied by thickening of the corner.

One of the aspects of the present invention is to provide the hot and cold composite formed square and rectangular steel tube with the thickened corners.

The radius of an outer corner of the square and rectangular steel tube meets the following conditions:

when t is less than or equal to 6 mm, R is greater than 0 and less than 2.0 t, preferably, R is greater than 0 and less than 1.5 t, and more preferably, R is greater than 0 and less than 0.5 t;

when t is greater than 6 and less than or equal to 10 mm, R is greater than 0 and less than 2.5 t, preferably, R is greater than 0 and less than 2.0 t, and more preferably, R is greater than 0 and less than 0.75 t; and when t is greater than 10 mm, R is greater than 0 and less than 3.0 t, preferably, R is greater than 0 and less than 2.5 t, and more preferably, R is greater than 0 and less than 1.0 t.

Wherein t is the wall thickness of the square and rectangular steel tube; R is the radius of each of the outer corners of the four corners of the square and rectangular steel tube.

The wall thickness of each corner of the square and rectangular steel tube is in the range of 1.0 t to 1.8 t, preferably in the range of 1.0 t to 1.2t.

Preferably, the perimeter of the cross section of a square and rectangular steel tube with a single welded seam is in the range of 80 mm to 4800 mm;

the wall thickness of a straight tube of the square and rectangular steel tube with the single welded seam is in the range of 6 mm to 70 mm;

the perimeter of the cross section of a square and rectangular steel tube with double welded seams is 1600 mm to 9600 mm; and the wall thickness of a straight tube of the square and rectangular steel tube with the double welded seams is in the range of 20 mm to 80 mm.

The second aspect of the present disclosure is to provide the production method of the hot and cold composite formed square and rectangular steel tube with the thickened corners.

The method comprises:

(1). a pre-finished square and rectangular steel tube is smoothly and symmetrically led into a subsequent production system after being rolled;

(2). the four corners of the square and rectangular steel tube are locally heated by an induction coil;

(3). the square and rectangular steel tube with the corners heated enters precision forming units in sequence, and each forming unit performs rolling forming on the four corners of the square and rectangular steel tube; and at the same time, the square and rectangular steel tube generates thermal tension between the two adjacent units by controlling the difference between the rotation speeds of rollers of every two adjacent units in the rolling process, so that the redundant deformation in the hot finishing process is eliminated;

(4). a water-cooling system is used for performing controlled cooling on the square and rectangular steel tube to ensure the strength performance of the finished square and rectangular steel tube, and then air-cooling is performed; and (5). the finished square and rectangular steel tube is cut.

Wherein preferably, step (2). the heating temperature is in the range of 750 DEG C to 1100 DEG C, and the heating time is not less than 15 seconds.

step (3). a flame spray gun heat preservation system is used for heating the four corners of the square and rectangular steel tube to ensure the constant temperature of the square and rectangular steel tube in the hot finishing stage and prevent the temperature of the square and rectangular steel tube from decreasing;

the temperature is controlled in the range of 700 to 950 DEG C;

step (3). the difference between the roller diameters of every two adjacent precision forming units is 1 to 5 mm.

step (3). the number of the precision forming units is five; among the five precision forming units the first unit, the third unit and the fifth unit are fixed, and the second unit and the fourth unit can rotate; and the rotation is realized by worm and gear devices.

step (3). after the square and rectangular steel tube passes through each precision forming unit, the change degree of the sectional area of the steel tube is in the range of 0 to 5%.

The present disclosure specifically can adopt the following technical scheme:

The production method of the hot and cold composite formed square and rectangular steel tube with the thickened corners belongs to a secondary hot forming process; the thickness of each corner of the square and rectangular steel tube with the thickened corners is not less than the wall thickness of an original sheet, and is in the range of t-1.8 t; there are no micro-cracks on the surface of the steel tube; the participating stress of the corner basically disappear; the radius of the round corner of the steel tube is smaller than the radius of the round corner of a traditional cold-rolled square and rectangular tube; for the radius R of the outer corner, when the wall thickness t is less than or equal to 6 mm, R is greater than 0 and less than 2.0 t, when t is greater than 6 and less than or equal to 10 mm, R is greater than 0 and less than 2.5 t, and when t is greater than 10 mm, R is greater than 0 and less than 3.0 t; meanwhile the square and rectangular steel tube produced by the process is suitable for all types of steel; and the production scale is as follow: perimeter in the range of 80 mm to 9600 mm, and wall thickness in the range of 6 mm to 80 mm. Due to the disappearance of the residual stress at the corners of the square and rectangular tube produced by the process, the ductility of the steel tube becomes stronger, the corner radius becomes smaller, and the corner thickness increases, therefore, the section performance is obviously improved, and meanwhile the welding performance of the steel tube is improved.

The production process of the hot and cold composite formed square and rectangular steel tube with the thickened corners comprises the following steps of:

(1). a feeding and leading-in system: the pre-finished square and rectangular steel tube is smoothly and symmetrically led into the subsequent production system after being rolled;

(2). a local induction heating system: in the system, the four corners of the square and rectangular steel tube with the large round corner radius are locally heated by the induction coil, meanwhile an automatic feedback system is used for ensuring the accuracy and stability of the heating temperature, and the heating temperature is in the range of 750 DEG C to 1100 DEG C;

(3). a hot finishing and rolling system: the square and rectangular steel tube with the corners heated enters the five precision forming units in sequence, wherein each forming unit performs rolling forming on the four corners of the square and rectangular steel tube without performing forming treatment on a flat plate area of the square and rectangular steel tube; and the effects of increasing the thicknesses of the four corners and reducing the radii of the four corners are achieved in a corner rolling mode. At the same time, the square and rectangular steel tube generates thermal tension between the two adjacent units by controlling the difference between the rotation speeds of rollers of every two adjacent units in the rolling process to be 1-5 mm, so that the redundant deformation generated in the hot finishing process is eliminated; and the temperature at this stage is controlled in the range of 700 to 950 DEG C.

(4). among the five precision forming units, the first unit, the third unit and the fifth unit are fixed to ensure the stability of the advancing direction and the forming direction of the square and rectangular tube in the forming process, and the second unit and the fourth unit can rotate, and can immediately straighten and correct redundant deformation such as distortion and warpage occurring in the production process, so that various defects are eliminated, and the shape accuracy and performance quality of the obtained square and rectangular tube product are greatly improved.

(5). a flame spray gun heat preservation system is used for ensuring the constant temperature of the square and rectangular steel tube in the hot finishing stage and preventing the temperature of the square and rectangular steel tube from decreasing.

(6). a water-cooling system is used for performing controlled cooling on the square and rectangular steel tube to ensure the strength performance of the finished square and rectangular steel tube; and (7). a cutting system is used for cutting the finished square and rectangular tube.

Compared with the prior art, the production method has the following characteristics that:

(1). compared with a traditional roll forming process, the secondary hot roll forming process produces more comprehensive steel, and the produced square and rectangular tube is larger in scale with obvious technological leading superiority and wide application range; and compared with a hot stamping forming process, the secondary hot roll forming process has high production efficiency, and realizes energy saving and consumption reduction, the produced product has better performance, and requirements on forming equipment are lower.

(2). the local heating technology can realize the heating of the four corners of the square and rectangular tube, eliminates the residual stress caused by the work hardening in the cold-rolled forming process, improves the corner performance, meanwhile has no influence on a base material itself, and ensures the overall performance of the raw material; at the same time, compared with a thermoforming production process, the process has the characteristics that the heating area is small, the heating method is induction heating, the production efficiency is high, the process is green and environmentally-friendly, and the energy consumption and the cost are greatly reduced.

(3). The heat preservation system and the water-cooling system are introduced for controlling rolling and cooling, so that the material properties of the square and rectangular tube can be improved to the maximum extent. The heat preservation system can ensure that the material is always kept at a constant temperature in the secondary hot forming process. The water-cooling system can control the cooling of the square and rectangular tube after forming, so that the strength performance of the square and rectangular tube is improved.

Some characteristics of the present disclosure are embodied in the following aspects:

1. Rollers of a hot and cold composite formed rolling unit set are distributed at the four corners of the square and rectangular tube, and directly perform rolling forming on the four outer corners of the square and rectangular tube; the rollers at the four corners can move in transverse, longitudinal and forming directions simultaneously to suit the forming of square and rectangular tubes of different sizes. The direct effect produced is that the size range of the square and rectangular tube can be greatly enlarged compared with the size range of a previous square and rectangular tube, and the largest square and rectangular steel tube with the perimeter of 9600 mm and the wall thickness of 80 mm can be produced. In addition, the size of the side length of the square and rectangular tube produced by the existing equipment requires the size of the roller, which greatly limits the production of large-sized square and rectangular tubes. One set of equipment can only produce products of one specification. However, the system performs rolling forming on the corners of the square and rectangular tube without changing the rollers; and a set of equipment can be used for producing products of all specifications, so that the production cost is greatly reduced.

2. The hot and cold composite formed rolling mill set of the present disclosure is totally provided with the five precision forming units, wherein the first precision forming unit, the third precision forming unit and the fifth precision forming unit are fixed to ensure the stability of the advancing direction and forming direction of the square and rectangular tube in the forming process; the second precision forming unit and the fourth precision forming unit can rotate; and the direct effect produced is that the redundant deformation such as distortion and warpage occurring in the production process is immediately straightened and corrected, so that various defects are eliminated, and the shape accuracy and performance quality of the obtained square and rectangular tube product are greatly improved. At the same time, as there are five precision forming units, the corner shape of the square and rectangular tube can be changed to a greater extent, so that the corner shape is closer to a right angle, and the wall thickness of the corner is increased more obviously, thus, the section performance of the square and rectangular tube is improved, the mechanical properties and welding performance become better, and the wall thickness range of the square and rectangular tube that can be produced also becomes larger.

3. In the present disclosure, except for the first precision forming unit, one heat preservation device is arranged in front of each of the subsequent four precision forming units to ensure the constant temperature of the square and rectangular tube in the entire precision forming process. The direct effect produced is that the forming temperature of the square and rectangular tube is constant; the deformation is easier; each corner of the square and rectangular tube can be turned into a right angle efficiently and more easily; the increase in the wall thickness of the corner becomes natural; the size of the square and rectangular tube which can be produced also becomes larger; and the performance conditions of the obtained square and rectangular tube are better.

The invention claimed is:

1. A steel tube, comprising:
a square and rectangular steel tube with thickened corners formed by hot and cold composite, wherein a cross section of the square and rectangular steel tube is in a square or a rectangular shape, the square and rectangular steel tube further comprises a straight tube and four corners, and radius of an outer corner of the square and rectangular steel tube meets one of following conditions:
when wall thickness (t) of the straight tube of the square and rectangular steel tube is less than or equal to 6 mm, radius (R) of each of outer corners of the four corners of the square and rectangular steel tube is greater than 0 and less than 2.0 t;
when t is greater than 6 mm and less than or equal to 10 mm, R is greater than 0 and less than 2.5 t; and
when t is greater than 10 mm, R is greater than 0 and less than 3.0 t; and
wherein wall thickness of each corner of the square and rectangular steel tube is in a range of 1.0 t to 1.8 t.

2. The steel tube of claim 1, wherein the radius of the outer corner of the square and rectangular steel tube further meets one of following conditions:
when t is less than or equal to 6 mm, R is greater than 0 and less than 1.5 t;
when t is greater than 6 mm and less than or equal to 10 mm, R is greater than 0 and less than 2.0 t; and
when t is greater than 10 mm, R is greater than 0 and less than 2.5 t.

3. The steel tube of claim 1, wherein the radius of the outer corner of the square and rectangular steel tube further meets one of following conditions:
when t is less than or equal to 6 mm, R is greater than 0 and less than 0.5 t;
when t is greater than 6 mm and less than or equal to 10 mm, R is greater than 0 and less than 0.75 t; and
when t is greater than 10 mm, R is greater than 0 and less than 1.0 t.

4. The steel tube of claim 1, wherein the wall thickness of each corner of the square and rectangular steel tube is in a range of 1.0 t to 1.2 t.

5. The steel tube of claim 1, wherein a perimeter of the cross section of a square and rectangular steel tube with a single welded seam is in a range of 80 mm to 4800 mm; and
the wall thickness of the straight tube of the square and rectangular steel tube with the single welded seam is in a range of 6 mm to 70 mm.

6. The steel tube of claim 1, wherein a perimeter of the cross section of a square and rectangular steel tube with double welded seams is in a range of 1600 mm to 9600 mm; and
the wall thickness of the straight tube of the square and rectangular steel tube with the double welded seams is in a range of 20 mm to 80 mm.

* * * * *